United States Patent
Shirane

(10) Patent No.: US 7,444,186 B2
(45) Date of Patent: Oct. 28, 2008

(54) PROGRAMMABLE CONTROLLER SYSTEM

(75) Inventor: Kakuto Shirane, Mishima (JP)

(73) Assignee: Omron Corporation, Kyoto-Shi (JP)

( * ) Notice: Subject to any disclaimer, the term of this patent is extended or adjusted under 35 U.S.C. 154(b) by 217 days.

(21) Appl. No.: 11/363,268

(22) Filed: Feb. 28, 2006

(65) Prior Publication Data

US 2006/0230188 A1 Oct. 12, 2006

(30) Foreign Application Priority Data

Mar. 1, 2005 (JP) ............... 2005-056582

(51) Int. Cl.
*G05B 15/02* (2006.01)
(52) U.S. Cl. ................. 700/9; 700/11; 700/23
(58) Field of Classification Search ............. 700/9, 700/11, 18, 23, 26
See application file for complete search history.

(56) References Cited

U.S. PATENT DOCUMENTS 6,952,727 B1 * 10/2005 Lindner et al. ............. 709/224
2005/0143840 A1 * 6/2005 Matsukura et al. ............. 700/9
2006/0074494 A1 * 4/2006 McFarland ................... 700/1

FOREIGN PATENT DOCUMENTS

| JP | 2000-047717 | 2/2000 |
|---|---|---|
| JP | 2000-267710 | 9/2000 |
| JP | 2001-217851 | 8/2001 |
| JP | 2004-357194 | 12/2004 |

* cited by examiner

*Primary Examiner*—Thomas K Pham
(74) *Attorney, Agent, or Firm*—Foley & Lardner LLP

(57) ABSTRACT

A programmable controller system comprises networks including a plurality of programmable controllers and a development support device. One of the programmable controllers is set as a relay programmable controller. The development support device is used by online-connecting to the relay programmable controller via a communication line and by switching connecting destination to a target programmable controller on the networks during a state of online-connecting to the relay programmable controller.

3 Claims, 13 Drawing Sheets

| Network address of final network | Network address of relay network | Node address of relay node |
|---|---|---|
| 3 | 1 | N |

Fig. 4A

| Network address of final network | Network address of relay network | Node address of relay node |
|---|---|---|
| 3 | 2 | M |

Fig. 4B

| Network address of self network | Unit number of communication unit |
|---|---|
| 3 | n |

The name of the relay PLC
(network number A, node number a)   OK
The name of the target PLC
(network number X, node number x)   NG \>\> Fault of "the name of the target PLC" or fault of the network between "the name of the relay PLC" and "the name of the target PLC" is possibly present.

Fig. 8

```
The name of the relay PLC
(network number A, node number a)   NG

>> The routing table of "the name of the relay PLC" is possibly
incorrect.
```

Fig. 9

```
The name of the relay PLC
(network number A, node number a)   OK
```

Fig. 10

The name of the relay PLC
(network number A, node number a)   OK
The name of the intermediate node
(network number B, node number b)   OK
The name of the target PLC
(network number X, node number x)   NG >> Fault of "the name of the target PLC" or fault of the network between "the name of the intermediate node" and "the name of the target PLC" is possibly present.

Fig. 11

The name of the relay PLC
(network number A, node number a)   OK
The name of the intermediate node
(network number B, node number b)   NG >> The routing table of "the name of the intermediate node" is possibly incorrect.

Fig. 12

```
The name of the relay PLC
(network number A, node number a)   OK
The name of the intermediate node
(network number B, node number b)   OK
```

PROGRAMMABLE CONTROLLER SYSTEM

BACKGROUND OF THE INVENTION

1. Field of the Invention

The present invention relates to a programmable controller (hereinafter, PLC) system in which a plurality of PLCs are connected via a network.

2. Description of the Related Art

In the case where a plurality of PLCs connected to a network are monitored, a computer (development support device) having a monitoring function is connected directly to a PLC which is desired to be monitored via a communication cable. In such a method, however, the computer should be brought around the PLC which is desired to be monitored each time, and thus this method is inconvenient.

A technique such that a computer is connected only to one PLC on the network and the other PLCs on the network are monitored via the one PLC is, therefore, known. (See, for example, Japanese Patent Application Laid-Open No. 2000-47717.).

With the above publicly-known technique, in the case where the other PLCs on the network (hereinafter, target PLCs) are monitored via the PLC, even if communication cannot take place between the computer and the target PLC, it is quite difficult to find a place on a communication path between the computer and the target PLC where abnormality occurs. Particularly, in the case where the communication path covers a plurality of networks, it is more difficult to uncover the cause for the abnormality.

For example, in a system where a personal computer (development support device) is connected to a specified one PLC (hereinafter, a relay PLC) via a connecting cable and the relay PLC is connected to the target PLC by a network, when a user monitors the target PLC and edits parameters of the target PLC, the following operating steps are taken.

That is to say, at the first step, communication specification (communication protocol, communication speed and the like) between the personal computer and the target PLC is set, and at the second step, the target PLC is online-connected. The target PLC is monitored and its parameters are edited at the third step.

At this time, the connection with the target PLC cannot be made at the second step, and thus an error message such as "communication error" or "type is different" is displayed. The communication is cut during the monitoring of the target PLC at the third step, and thus an error message such as "communication error" is displayed. Such a not-operable condition is occasionally developed.

As the causes for such troubles, the case where a trouble exists between the personal computer and the relay PLC, the case where a trouble exists between the relay PLC and the target PLC, and the case where a trouble exists in the target PLC itself are assumed.

The trouble between the personal computer and the relay PLC includes (1) disconnection of the connecting cable and mis-wiring, (2) an error in communication specification to be set on the side of the personal computer, (3) mis-setting of a communication port of the relay PLC, and the like.

The trouble between the relay PLC and the target PLC includes (1) the disconnection of the connecting cable on the communication path, (2) mis-setting of a routing table previously stored in the PLC on the communication path, (3) communication time-out due to communication load of the network on the communication path, and the like.

The trouble of the target PLC itself includes (1) the case where the target PLC is not an assumed PLC, (2) the case where a communication response is not made due to a change in the setting of the target PLC or reset of the target PLC, and the like.

In the conventional devices, when a PLC is connected via a network, a user can monitor a plurality of PLCs, edit programs and set parameters without switching physical connection of a cable. On the other hand, when communication cannot take place via the network, it takes a very long time to uncover causes for it due to a complicated network path or variety of cause items.

Particularly in a structure of routing which transmits a communication command to the target PLC, when a routing table is previously set in each PLC on the network, a user can connect a target PLC only by specifying a network address and a node address of the target PLC without being conscious of the communication path. In a network where the PLC system is now being constructed, however, the setting of a routing table itself occasionally has a problem. At this time, each setting of the PLCs should be checked one by one, and thus it takes a very long time to solve the problem.

SUMMARY OF THE INVENTION

The present invention is devised in view of the above problems, and its object is to provide a PLC system in which when PLCs are connected via a network, the PLCs can be monitored, programs can be edited and parameters can be set without switching physical connection of a cable, and in the case where communication has abnormality such that communication via the network cannot take place, the time required for uncovering the causes for the abnormal communication can be shortened.

The other objects and working effects of the present invention will be easily understood by a person skilled in the art according to the following description in the specification.

A PLC system of the present invention includes: networks including a plurality of PLCs; and one development support device. One of the PLCs is set as a relay programmable controller.

The development support device is used by online-connecting to the relay programmable controller via a communication line and by switching connecting destination to a target programmable controller on the networks during a state of online-connecting to the relay programmable controller.

According to such a constitution, since the communication path to the target PLC is divided into two: a section between the development support device and the relay PLC; and a section between the relay PLC and the target PLC, even if abnormal communication occurs, the cause for it is uncovered easily.

In a preferable embodiment of the present invention, when the development support device fails to online-connect to the relay programmable controller, existence of abnormal communication between the development support device and the relay programmable controller is displayed on a display part of the development support device.

According to such a constitution, existence of the abnormal communication between the development support device and the relay programmable controller is accurately known, so that the communication can be recovered quickly.

In a preferable embodiment of the present invention, when the development support device switches the connecting destination in the state of the online-connecting to the relay programmable controller and fails to connect to the target programmable controller, existence of abnormal communication between the relay programmable controller and the target controller is displayed on a display part of the development support device.

According to such a constitution, the existence of the abnormal communication between the relay programmable controller and the target controller is accurately known, so that the communication can be recovered quickly.

In a preferable embodiment of the present invention, when the development support device is connected to the target programmable controller, the device repeatedly executes a communication test on both the relay programmable controller and the target programmable controller, and when the communication test on any one of both controllers fails, occurrence of abnormal communication between the development support device and the relay programmable controller or between the relay programmable controller and the target programmable controller is displayed on a display part of the development support device.

According to such a constitution, in an operational state, occurrence of the abnormal communication in the section between the development support device and the relay programmable controller or in the section between the relay programmable controller and the target programmable controller is accurately known, so that the communication can be recovered quickly.

In a preferable embodiment of the present invention, when the abnormal communication occurs between the development support device and the target programmable controller, the development support device refers to a routing table so as to specify an abnormal node.

According to such a constitution, when the abnormal communication occurs between the development support device and the target programmable controller, the abnormal place can be specified quickly.

According to the present invention, in the PLC system where when PLC is connected via a network, PLC can be monitored, a program can be edited and parameters can be set without requiring switching of the physical connection of a communication cable, when the abnormal communication such that communication cannot take place via a network, the time required for uncovering the abnormal communication can be shortened.

BRIEF DESCRIPTION OF THE DRAWINGS

FIGS. 4A to 4C show explanatory diagrams illustrating examples of use routing tables from PC#1 to PC#;

FIG. 7 shows an explanatory diagram of a screen example 1;

FIG. 8 shows an explanatory diagram of a screen example 2;

FIG. 9 shows an explanatory diagram of a screen example 3;

FIG. 10 shows an explanatory diagram of a screen example 4;

FIG. 11 shows an explanatory diagram of a screen example 5;

FIG. 12 shows an explanatory diagram of a screen example 6; and

DETAILED DESCRIPTION OF THE PREFERRED EMBODIMENT

Figure 1:
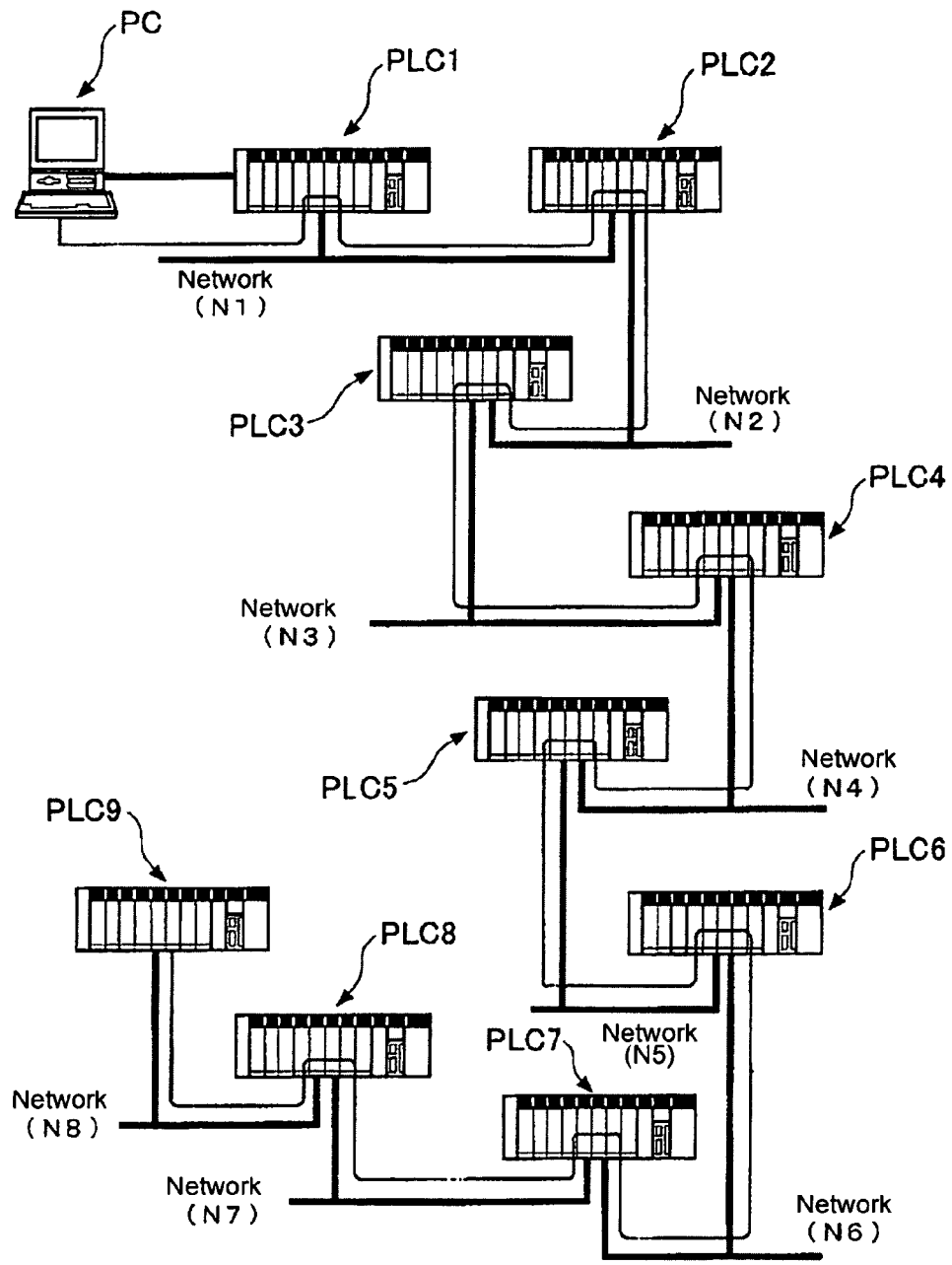
FIG. 1 shows a constitutional diagram of a network to which the present invention is applied.

A preferred embodiment of the present invention is explained in detail below with reference to the accompanying drawings. FIG. 1 shows one example of a network constitutional diagram of a PLC network to which the present invention is applied.

As shown in FIG. 1, the PLC system includes nine PLCs (PLC1 to PLC9). These PLCs (PLC1 to PLC9) are connected via eight system networks (N1 to N8). That is to say, the PLC1 and the PLC2 are connected via the network N1. The PLC2 and the PLC3 are connected via the network N2. The PLC3 and the PLC4 are connected via the network N3. The PLC4 and the PLC5 are connected via the network N4. The PLC5 and the PLC6 are connected via the network N5. The PLC6 and the PLC7 are connected via the network N6. The PLC7 and the PLC8 are connected via the network N7. The PLC8 and the PLC9 are connected via the network N8. Network addresses are given as information for uniquely specifying the individual networks to the networks composing the PLC system, respectively. Also, each PLC has node addresses as information for uniquely specifying the PLCs in the networks connected directly to the PLCs. The PLCs in the PLC system can be uniquely specified by combinations of the network addresses and the node addresses.

The PLC1 which is directly connected to a personal computer PC via a cable is called as a relay PLC, and the PLC9 as connecting destination is called as a target PLC.

Figure 2:
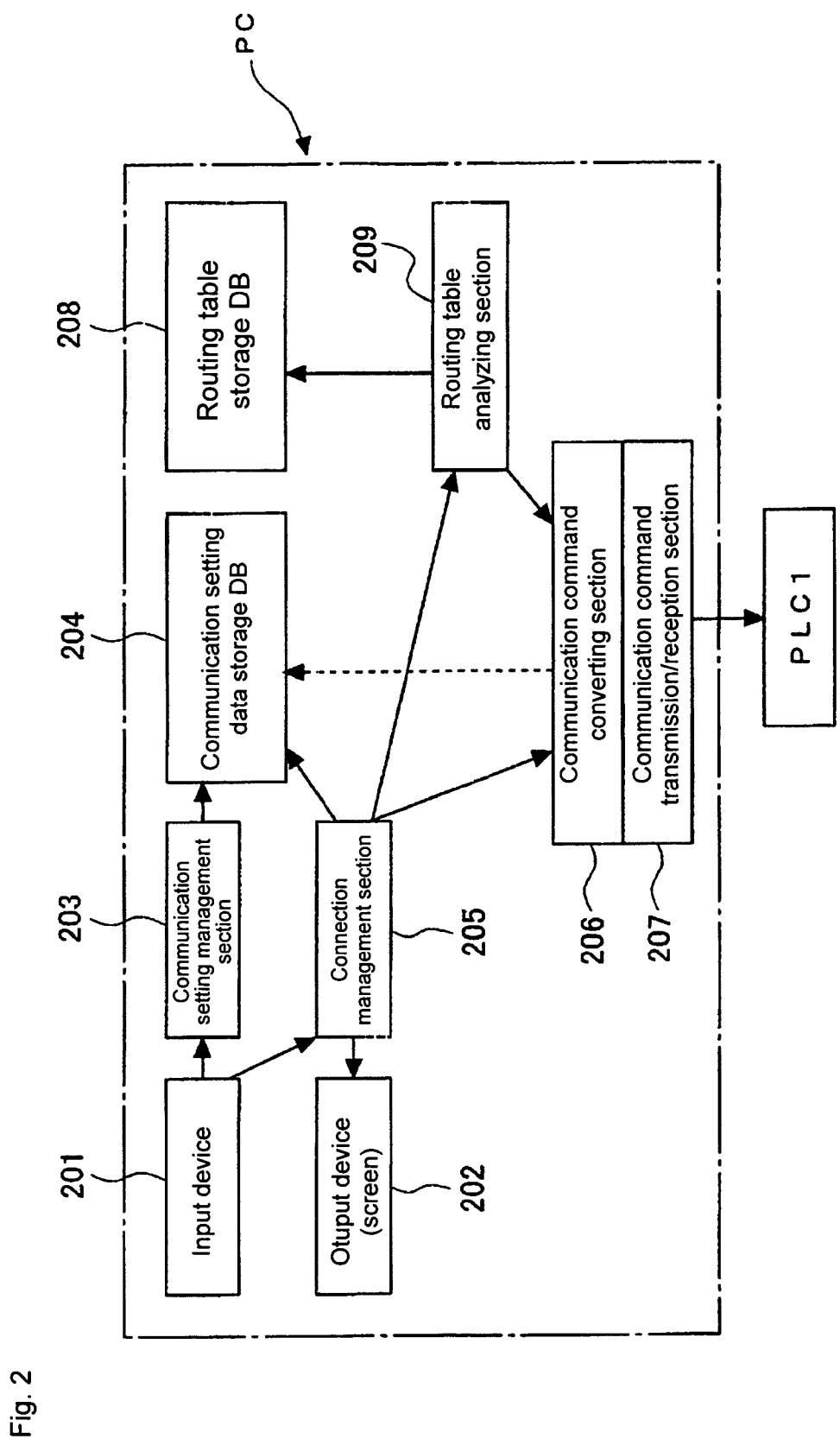
FIG. 2 shows a constitutional diagram of a device according to the present invention.
Figure 3:
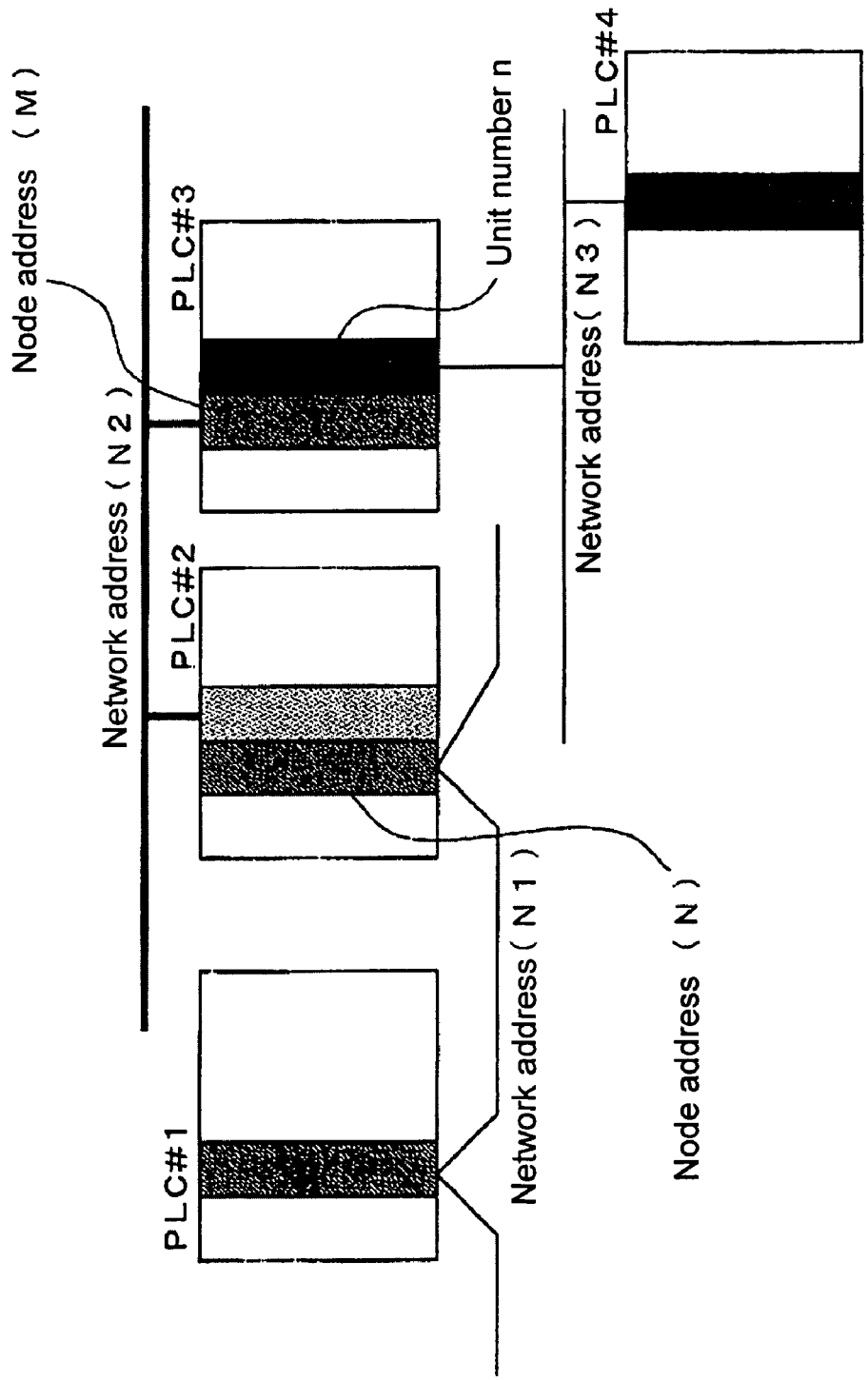
FIG. 3 shows a systematic diagram of the network.

FIG. 2 shows a constitutional diagram of a device according to the present invention. The personal computer (PC) which functions as a development support device, as shown in FIG. 2, includes an input device 201, an output device 202, a communication setting management section 203, a communication setting data storage DB 204, a connection management section 205, a communication command converting section 206, a communication command transmission/reception section 207, a routing table storage DB 208, and a routing table analyzing section 209. These functional elements are realized in a software form by incorporating predetermined programs into the personal computer. In the drawing, PLC1 is the relay PLC.

The device according to the present invention (1) narrows down the cause according to zone division, and (2) narrows down the cause according to analysis of a routing table. After the device defines a range of normal communication and a range of abnormal communication, it posts the defined result to a user. The user confirms a state of a communication path in the narrowed-down range, so that the time required for uncovering the cause can be shortened.

The narrowing-down of the cause according to the zone division is, therefore, explained.

[Setting of Communication Between Personal Computer and Relay PLC]

The user uses the input device 201 to set a communication specification between the personal computer PC and the relay PLC (PLC1). For example, contents set by the user are converted into a predetermined format by the communication setting management section 203, and the converted data are saved in the communication setting data storage DB 204. The user can change the setting of the communication specification later as the need arises.

[The Connection Between the Personal Computer and the Relay PLC]

The user uses the input device 201 to operate online connection with the set relay PLC (PLC1). Due to this operation, the connection management section 205 instructs the communication command converting section 206 to conduct a communication test on the relay PLC (PLC1). The communication command converting section 206 reads the communication setting of the relay PLC (PLC1) from the communication setting data (storage DB 204) so as to conduct the communication test. As a result, when the result is "successful", the personal computer PC and the relay PLC (PLC1) are in an online mode. On the contrary, when the test result is "failed", the failure of the communication test on the relay PLC (PLC1) is posted to the user via the output device 202.

[The Connection Switching Into the Target PLC (PLC9)]

When the personal computer PC and the relay PLC (PLC1) are in the online mode, the user inputs the network address and the node address for specifying the target PLC via the input device 201 so as to be capable of switching the target PLC. The connection management section 205 instructs the communication command converting section 206 to conduct the communication test on the target PLC (PLC9). When the test result is "successful", the connection with the specified target PLC (PLC9) is made. When the test result is "failed", the failure of the communication test on the relay PLC (PLC1) is posted to the user via the output device 202.

[The Communication Check During the Connection]

In the device of the present invention, the connection management section 205 instructs the communication command converting section 206 to test the communication of the relay PLC (PLC1) and the target PLC (PLC9) periodically (initial value is set to 1 sec, and this setting can be changed) during the communication with the target PLC (PLC9). When the test result is "successful", the process is continued. When the rest results is "failed" in the relay PLC, occurrence of the communication error between the personal computer (PC) and the relay PLC (PLC1) is posted to the user via the output device 202. Thereafter, the system is switched into an offline mode. When the test result is "failed" in the target PLC (PLC9), occurrence of the communication error between the relay PLC (PLC1) and the target PLC (PLC9) is posted to the user via the output device 202. In this case, the system is maintained in the online mode, and the target PLC (PLC9) can be switched into another PLC.

The narrowing-down of the cause according to the analysis of the routing table is explained below. In the online connecting operation, when the communication with the target PLC (PLC9) cannot take place, the setting of the routing tables of the PLCs on the communication path from the relay PLC (PLC1) to the target PLC (PLC9) is possibly incorrect. Conventionally, in this case, all the routine tables should be checked, and it takes a very long time to specify the incorrect setting.

In the device of the present invention, when the connection with the target PLC (PLC9) is failed, the user conducts the communication test on another specified target PLC so as to be capable of narrowing down an abnormal place found by analyzing the routing table. As to the summary of this function, while the routing tables from the relay PLC (PLC1) to the target PLC (PLC9) are being traced, the communication test is conducted so that a section where the communication is impossible and an abnormal place are specified.

The routing tables are explained with reference to FIGS. 3 and 4A to 4C. That is to say, when data are transmitted and received between networks, it is necessary that a table in which a communication path from a certain PLC to a (another) network connected to a PLC as communication destination is recorded is previously recorded in the respective PLCs on the networks. This table is called as a "routing table". A "routing table" is composed of a "relay network table" and a "self network table".

The "relay network table" is a correspondence table among a target network (final network) which is not connected to the PLC, a network address and a node address of the PLC (first PLC) to be the first relay point on the path to the final network. When the PLC to be the relay point is traced, the route can reach the final network. On the other hand, the "self network table" is a correspondence table between unit numbers (for uniquely specifying units in the PLCs composed of plural units) of communication units attached to the PLCs and network addresses of the networks connected to the communication units. The routing tables are created on the personal computer into which exclusive software is installed, and are transmitted to be stored in the PLCs, respectively.

[Reading of the Routing Tables]

The development support device reads the routing tables from the PLCs (intermediate nodes) on the communication path. The first intermediate node is the relay PLC (PLC#1) which is a starting point of the communication path. The routing table analyzing section 209 instructs the communication command converting section 206 to read the routing table and store the read routing table in the routing table storage DB 208. At this time, when the routing table is not present, non-presence of the routing table in the relay PLC (PLC#1) is posted to the user via the output device 202, and the process is ended. On the contrary, when the routing table is present, the path is extracted.

[Extraction of the Path]

The network address and the anode address of a next intermediate node are extracted from the read routing table. Concretely, the development support device searches the self network table and the relay network table in this order for the network address of the target PLC. At this time, when the network address is not present, non-presence of the network address of the target PLC in the routing table of the current intermediate node is posted to the user via the output device 202, and the process is ended. When the network address of the target PLC is preset in the self network table, the network address and the node address of the current intermediate node are displayed. The success of the communication test and high possibility of the trouble between the target PLC and the current intermediate node are posted to the user via the output device 202, and the process is ended. On the contrary, when the network address of the target PLC is present in the relay network table, the network address and the node address of the relay point are set in a new intermediate node, and the sequence goes to the routing table reading process.

Figure 5:
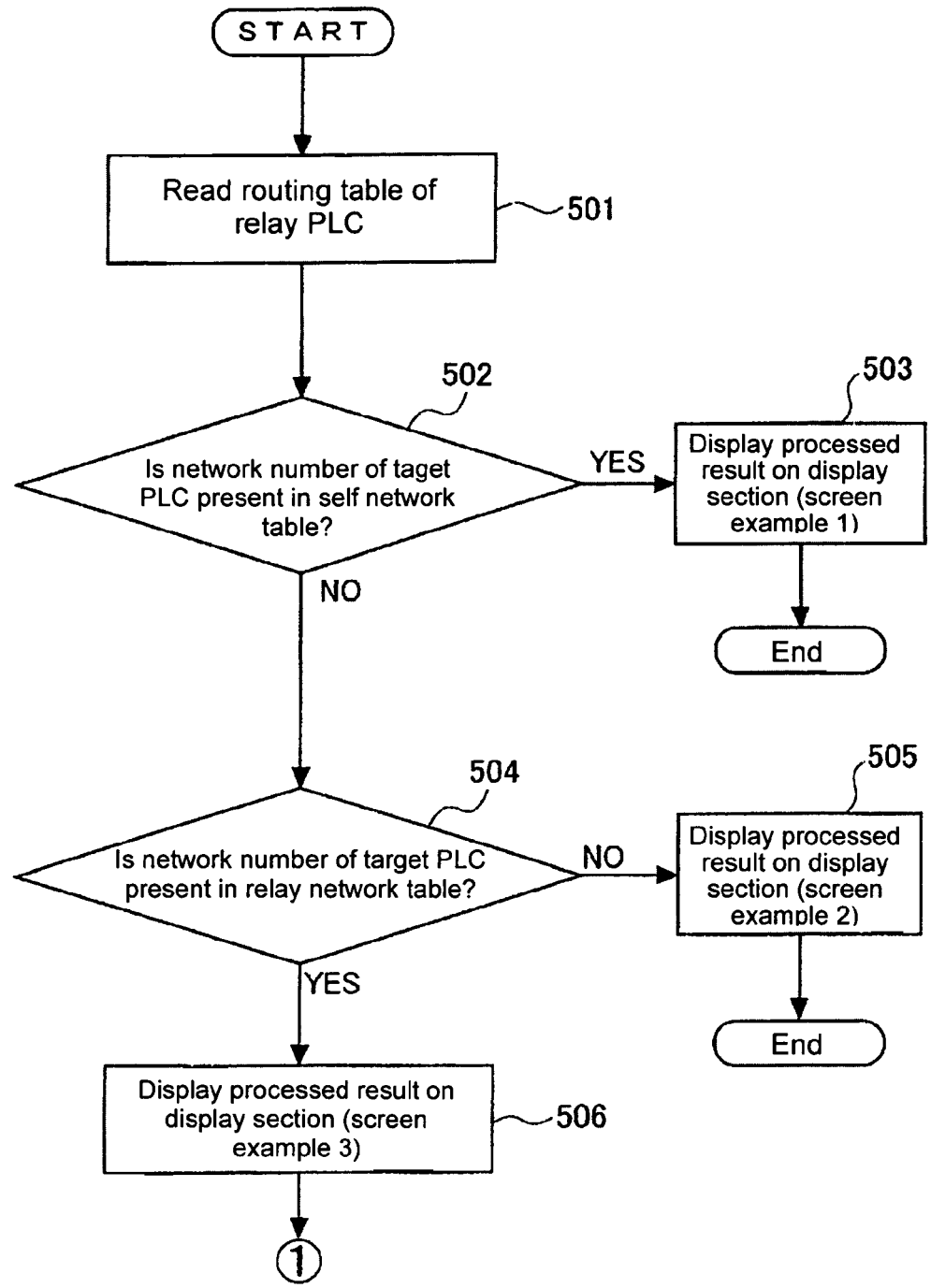
FIG. 5 shows a flowchart (1) illustrating a process for detecting an abnormal node.
Figure 6:
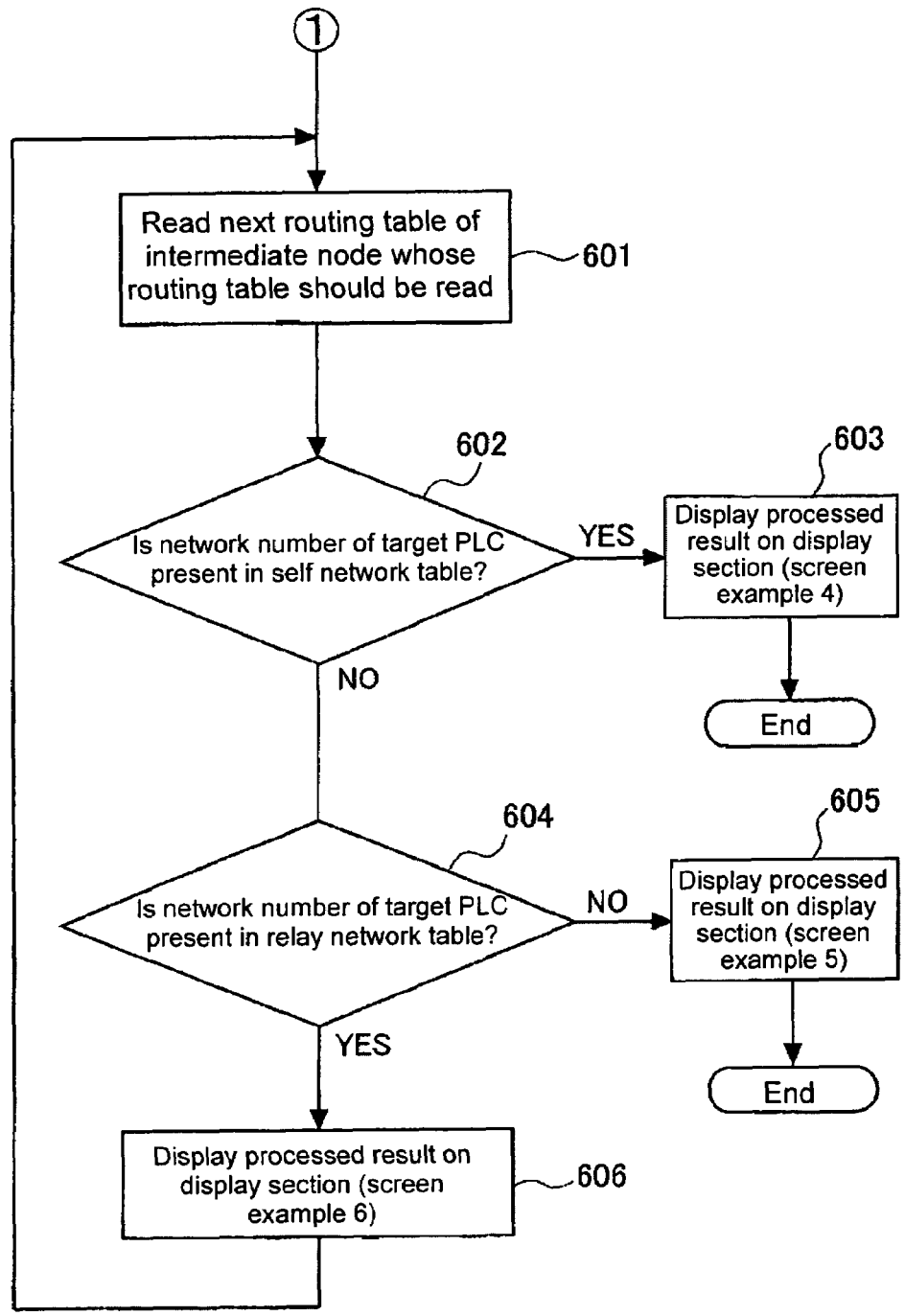
FIG. 6 shows a flowchart (2) illustrating the process for detecting an abnormal node.

Flowcharts (1 and 2) showing the process for detecting the above abnormal node are shown in FIGS. 5 and 6.

When the process is started in the drawings, a routing table stored in a predetermined memory of the relay PLC is read at step 501. Concretely, an MPU on the personal computer issues a command for reading the routing table (composed of the self network table and the relay network table) to relay PLC. The MPU of the personal computer receives a response to the command from the relay PLC. The MPU extracts data about the self network table and data about the relay network table from the received response, and stores these data as the self network table and the relay network table of the relay PLC into a predetermined memory.

At step 502, the MPU of the personal computer checks whether the network number which represents the network address of the target PLC is present in the self network table of the relay PLC stored in the predetermined memory at step 501. As a result of the check, when the network number of the target PLC is present, the sequence goes to step 503. As a result of the check, when the network number of the target PLC is not present, the sequence goes to step 504.

The MPU of the personal computer displays the processed result on a display section of the personal computer (corresponding to the output device 202) so as to post the result to the user at step 503. In this case, the MPU displays contents such that the communication line up to the relay PLC is normal but the communication is not possible between the relay PLC and the target PLC due to a fault (malfunction or the like of the communication units and the other units composing the PLC) of the target PLC (assumed to be) present in the network connected to the relay PLC or a fault of the network between the relay PLC and the target PLC (disconnection, noise influence of the communication line and the like) on the display section.

The display example is a screen example 1 in FIG. 7. In the screen example 1, the name of the relay PLC, the network number of the relay PLC, the node number of the relay PLC, and "OK" which represents that the relay PLC is normal are displayed on predetermined lines on the display section of the personal computer. Further, the name of the target PLC, the network number of the target PLC, the node number of the target PLC, and "NG" which represents that the communication with the target PLC is impossible are displayed on lines different from the above lines. In addition to this display, the cause for "NG" is displayed so that the cause for the impossible communication with the target PLC may be posted to the user.

At step 504, the MPU of the personal computer checks whether the network number of the target PLC is present in the relay network table stored in the predetermined memory at step 501. As a result of the check, when the network number of the target PLC is not present, the sequence goes to step 505. As a result of the check, when the network number of the target PLC is present, the sequence goes to step 506.

The MPU of the personal computer displays the processed result on the display section of the personal computer so as to post it to the user at step 505. In this case, the MPU displays contents such that the communication line up to the relay PLC is normal but the routing table read from the relay PLC is incorrect on the display section.

This display example is a screen example 2 in FIG. 8. In the screen example 2, the name of the relay PLC, the network number of the relay PLC, the node number of the relay PLC, and "NG" which represents that the routing table of the relay PLC is incorrect are displayed on predetermined lines on the display section of the personal computer. In addition to this display, the cause for "NG" is displayed so that the cause for impossible communication with the target PLC may be posted to the user.

The MPU of the personal computer displays processed result on the display section of the personal computer so as to post the result to the user at step 506. In this case, the MPU displays contents such that the communication line up to the relay PLC is normal and the routing table read from the relay PLC is normal on the display section.

This display example is a screen example 3 in FIG. 9. In the screen example 3, the name of the relay PLC, the network number of the relay PLC, the node number of the relay PLC, and "OK" which represents that the routing table of the relay PLC is normal are displayed on predetermined lines on the display section of the personal computer. After the processed result is displayed on the display section of the personal computer, the sequence goes to step 601 in FIG. 6.

With reference to FIG. 6, the MPU of the personal computer determines a next node (called as intermediate node) whose routing table should be read at step 601, and executes the process for reading the routing table of the intermediate node. Concretely, the MPU extracts a line which matches with the network number of the target PLC from the column of the network address of the final network in the relay network table currently read. The MPU issues a command for reading the routing table to a node (intermediate node) specified by the network number representing the network address of the relay network on the line and the node number representing the node address of the relay node. The MPU receives a response to the command from the intermediate node. The MPU extracts data about the self network table and data about the relay network table from the received response, and stores these data as the self network table and the relay network table of the intermediate node in a predetermined memory.

At step 602, the MPU of the personal computer checks whether the network number of the target PLC is present in the self network table of the intermediate node stored in the predetermined memory at step 601. As a result of the check, when the network number of the target PLC is present, the sequence goes to step 603. As a result of the check, when the network number of the target PLC is not present, the sequence goes to step 604.

At step 603, the MPU of the personal computer displays the processed result on the display section of the personal computer so as to post the result to the user. In this case, the MPU displays contents such that the communication circuit up to the intermediate node is normal but the communication between the intermediate node and the target PLC is impossible due to a fault of the target PLC (malfunction of the communication units and the other units composing the PLC) (assumed to be) present in the network connected to the intermediate node or a fault (disconnection, noise influence and the like of the communication line) of the network between the intermediate node and the target PLC on the display section.

This display example is a screen example 4 in FIG. 10. In the screen example 4, the name of the intermediate node, the network number of the intermediate node, the node number of the intermediate node and "OK" which represents that the intermediate node is normal are displayed on predetermined lines on the display section of the personal computer. Further, the name of the target PLC, the network number of the target PLC, the node number of the target PLC, and "NG" which represents that the communication with the target PLC is impossible are displayed on lines different from the above lines. In addition to the above display, the cause for "NG" is displayed, so that the cause for impossible communication with the target PLC may be posed to the user.

At step 604, the MPU of the personal computer checks whether the network number of the target PLC is present in the relay network table of the intermediate node stored in the predetermined memory at step 601. As a result of the check, when the network number of the target PLC is not present, the sequence goes to step 605. As a result of the check, when the network number of the target PLC is present, the sequence goes to step 606.

At step 605, the MPU of the personal computer displays the processed result on the display section of the personal computer so as to post the result to the user. In this case, the MPU displays contents such that the communication circuit up to the intermediate node is normal but the routing table read from the intermediate node is incorrect on the display section.

This display example is a screen example 5 in FIG. 11. In the screen example 5, the name of the intermediate node, the network number of the intermediate node, the node number of the intermediate node and "NG" which represents that the routing table of the intermediate node is incorrect are displayed on display lines on the display section of the personal computer. In addition to this display, the cause for "NG" is displayed, so that the cause for impossible communication with the target PLC may be posted to the user.

At step 606, the MPU of the personal computer displays the processed result on the display section of the personal computer so as to post the result to the user. In this case, the MPU displays contents such that the communication line up to the intermediate node is normal and the routing table read from the intermediate node is normal on the display section.

This display example is a screen example 6 in FIG. 12. In the screen display 6, the name of the intermediate node, the network number of the intermediate node, the node number of the intermediate node and "OK" which represents that the routing table of the intermediate node is normal are displayed on predetermined lines on the display section of the personal computer. After the processed result is displayed on the display section of the personal computer, the sequence returns to step 601, so that steps 601 to 606 are repeated.

The above embodiment explains the process for displaying the processed results on the display section which is executed in each case. The timing at which the processed result is displayed on the display section may be the last of the flow for detecting an abnormal node. For example, all the processed results are stored in a predetermined memory during the flow for detecting an abnormal node, and when the flow for detecting an abnormal node is ended, the stored processed results may be collectively displayed.

At step 601 in the above embodiment, when the intermediate node whose routing table should be read is determined, the command for reading the routing table is issued to the intermediate node. The process for reading the routing table is not limited to this. Before the command for reading the routing table is issued, a command for reading information about a type of the node is issued to the intermediate node, and a determination is made whether the communication with the intermediate node is possible by whether the response to the command is made. When the response is made (the communication is possible), a determination may be made whether the routing table is read according to the type information in the response, and a reading method may be determined.

Figure 13:
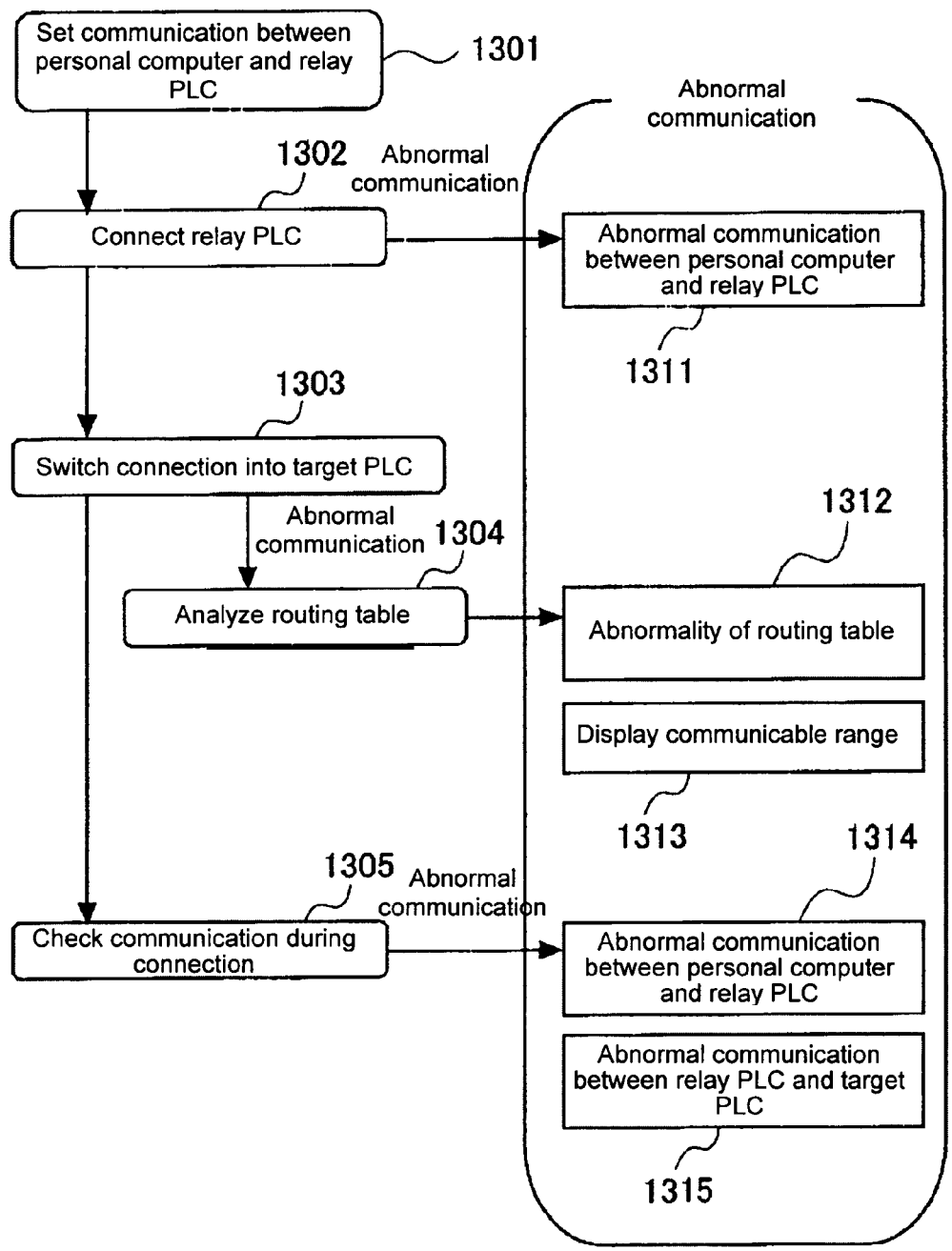
FIG. 13 shows an explanatory diagram totally illustrating a relationship between connecting stages and posting of abnormality.

FIG. 13 shows an explanatory diagram collectively showing a relationship between the connecting stages and the abnormality posting. As is clear from the drawing, in the present invention, at the first step, the communication between the personal computer and the relay PLC is set (step 1301), and at the second step, the connection with the relay PLC is made (step 1302). At the third step, the connection is switched into the target PLC (step 1303), and the fourth step, the communication during the connection is checked (step 1305).

At the second step, when the connection with the relay PLC is made (step 1302), if abnormal communication occurs, the abnormal connection between the personal computer and the relay PLC is posted (step 1311).

At the third step, when the connection switched into the target PLC (step 1303), if abnormal communication is discriminated, the routing table analyzing process is executed (step 1304). At this time, the condition that the routing table is abnormal (step 1312) and the communicable range (step 1313) are displayed.

At the fourth step, as a result of checking the communication during the connection (step 1305), if abnormal communication is discriminated, the abnormal communication between the personal computer and the relay PLC (step 1314) and the abnormal communication between the relay PLC and the target PLC (step 1315) are posted.

The user can, therefore, take a necessary countermeasure against each abnormality quickly based on the posting, and thus the time required for uncovering the cause for the abnormal communication can be shortened, so that the communication can be recovered quickly.

The present invention can provide the PLC system where when a PLC is connected via a network, a PLC can be monitored, a program can be edited and parameters can be set without requiring the switching of the physical connection of a cable, and when abnormal communication such that communication cannot take place via the network occurs, the time required for uncovering the cause for the abnormal communication can be shortened.

What is claimed is:

1. A programmable controller system, comprising:
   networks including a plurality of programmable controllers; and
   a development support device,
   wherein one of the programmable controllers is set as a relay programmable controller,
   wherein the development support device is used by online-connecting to the relay programmable controller via a communication line and by switching connecting destination to a target programmable controller on the networks during a state of online-connecting to the relay programmable controller,
   wherein when the development support device is connected to the target programmable controller, the device repeatedly executes a communication test on both the relay programmable controller and the target programmable controller,
   wherein when the communication test on the relay programmable controller fails, occurrence of abnormal communication between the development support device and the relay programmable controller is displayed on a display part of the development support device, and
   wherein when the communication test on the relay programmable controller fails and the communication test on the target programmable controller succeeds, occurrence of abnormal communication between the relay programmable controller and the target programmable controller is displayed on a display part of the development support device.

2. The programmable controller system of claim 1, wherein when the abnormal communication occurs between the development support device and the target programmable controller, the development support device refers to a routing table so as to specify an abnormal node.

3. The programmable controller system of claim 1, wherein when the development support device switches the connecting destination in the state of the online-connecting to the relay programmable controller and fails to connect to the target programmable controller, existence of abnormal communication between the relay programmable controller and the target controller is determined, and the development support device switches the connecting destination in the state of the online-connecting to another of the programmable controllers of the plurality of other programmable controllers as the target controller.

* * * * *